Feb. 13, 1962  G. P. BENTLEY ETAL  3,020,769
GYRO CAGING APPARATUS
Filed March 7, 1946
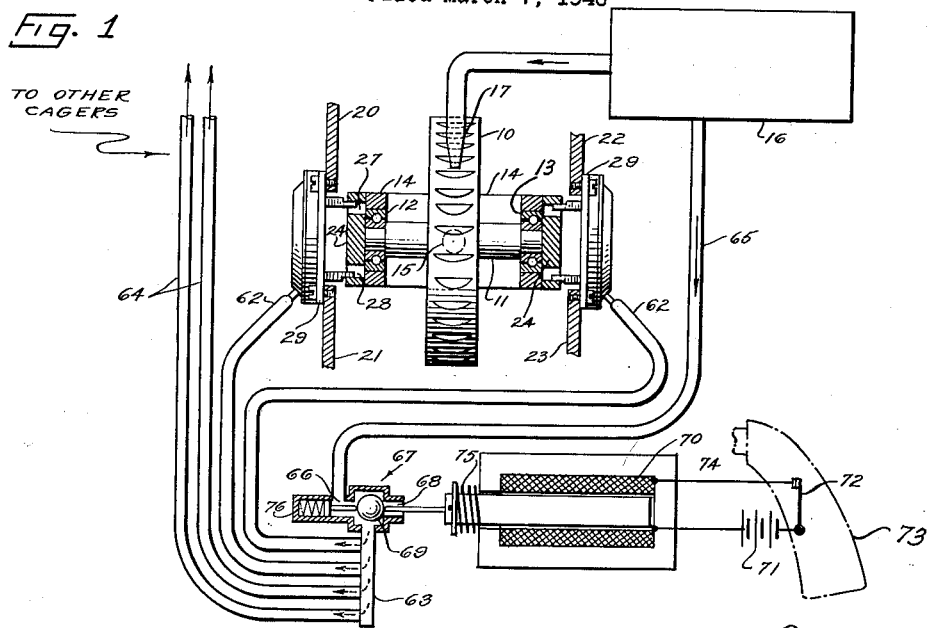
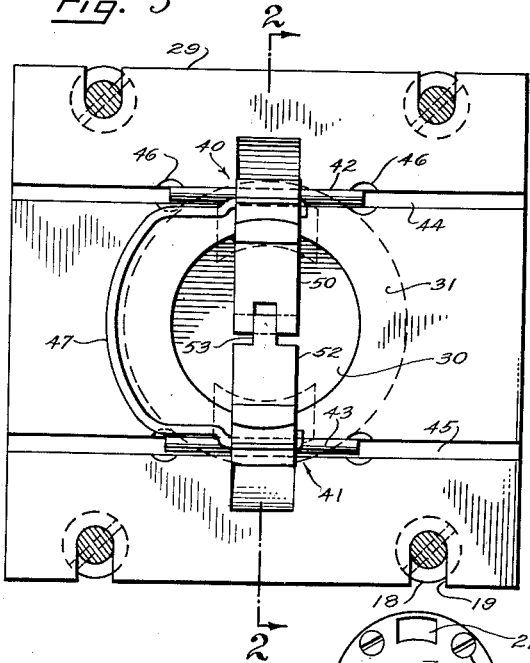
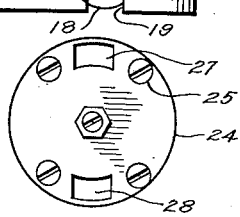
INVENTORS
G. P. BENTLEY
L. E. DUEGER
BY
ATTORNEY.

United States Patent Office 3,020,769
Patented Feb. 13, 1962

3,020,769
GYRO CAGING APPARATUS
George P. Bentley, Garden City, N.Y., and Laverne Edward Dueger, Lewisburg, Pa., assignors to Sperry Rand Corporation, a corporation of Delaware
Filed Mar. 7, 1946, Ser. No. 652,726
16 Claims. (Cl. 74—5.1)

This invention relates to a gyro casing apparatus.

Caging devices are well known in the gyro art and usually comprise a mechanism operable at will effective to retain the spin axis of the gyro in a predetermined neutral position. Caging devices however appear to have been used only with universally mounted gyros in which the gyro has freedom of rotation in any of three mutually perpendicular planes.

A rate of return gyro is a specialized application of the gyroscope. In this case the gyro has freedom of motion in but two planes, spring means being attached at the axis of the gimbal frame which tends to centralize the same.

A rate of turn gyro is so constructed that if the gimbal or rotor bearing frame is rotated about an axis, called the input axis, the rotor will tilt about the axis of precession as long as the motion continues. As soon as the rotor of the gyro starts to tilt, centralizing springs are acted upon, and the gyro rotor will continue to tilt until the torque exerted by the springs causes a precessional velocity about the output axis proportional to the rate of turn applied to the instrument case about the input axis. At this point all torques and velocities of the system are balanced. Rate of turn gyros of high accuracy have been developed for certain fire control devices. In one form, the gimbal frame of the gyro is supported and centralized by two frictionless bearing arrangements, each consisting of a short length of piano wire stretched between two cantilever supports fastened to the case of the gyro. A small yoke is fastened to the output shaft of the gyro and clamped in place on the suspension wire. Thus the gimbal frame is mounted in a manner that allows it to rotate through a small angle, usually of approximately two and one-half degrees, by twisting the wire. A gyro of the general type referred to is fully disclosed in the copending application of Byron L. Allison and Lan J. Wong, now U.S. Patent No. 2,409,178, dated October 15, 1946.

Computing gun sights using the specific type of gyro have become widely used. When a sight of this kind is slewed rapidly to overtake a target, the gyros become displaced in excess of the true angular rate of the target and it takes a few seconds before the gyros settle back and normal tracking can begin.

The range mechanism of one well-known computer of this type includes a range spring rod for each gyro adjustable to apply a restraining torque inversely proportional to range. Before slewing, in order to reduce excessive displacement of the gyros, the computer is manually set at minimum range and when the target is overtaken, and before tracking, the proper range is set back into the sight. If the gyros could be caged in a neutral position before slewing, these operations of the range mechanism could be eliminated and the operation of the sight considerably simplified.

It has been found, however, that rate gyros, especially those having spring suspensions, cannot be caged with sufficient accuracy with conventional caging devices, due largely to the lateral strain imposed by such caging devices on the spring suspension.

A feature of the present invention is the provision of a novel system for caging gyros particularly rate gyros.

Another feature of the invention is the provision of a novel apparatus by which a spring suspended gyro may be caged without lateral strain on the spring suspension.

Still another feature of the invention is the provision of a caging system including caging units of novel construction which may be attached readily to existing gyroscope structures, the caging units being easily adjustable to cage the gyro in the desired position.

The invention in another of its aspects relates to novel features of the instrumentalities described herein for achieving the principal objects of the invention and to novel principles employed in those instrumentalities, whether or not these features and principles are used for the said principal objects or in the said field.

A further feature of the invention is to provide improved apparatus and instrumentalities embodying novel features and principles, adapted for use in realizing the above objects and also adapted for use in other fields.

A further feature of the invention is the provision of a system for caging gyros by remote control.

Other features of the invention will be found in the following description given with the aid of the accompanying drawings of which:

FIG. 1 is a drawing showing a caging system schematically and partly in section according to a preferred embodiment of the invention;

FIG. 2 shows a caging unit in vertical section, the section being taken through 2—2 of FIG. 3;

FIG. 3 is a view showing in elevation the underside of a caging unit; and

FIG. 4 shows a member provided with caging slots adapted to be mounted on the gimbal frame.

Referring to FIG. 1 a gyro rotor 10 having a shaft 11 is supported by bearings 12 and 13 in a gimbal or rotor bearing frame 14, the gimbal frame being shown in section. The gimbal frame is of a conventional type and is supported at opposite ends, forming the output axis of the gyroscope. The support for one end of the gimbal frame is indicated by the dotted circle 15. The invention is particularly useful for gyros having frictionless torsion wire supports, although it will operate equally well with gyros having gimbal frames supported by conventional pivot arrangements.

The gyro is shown by way of example as being air driven, the compressed air being fed from a source 16, and projected onto the wheel by nozzle 17.

The present invention is particularly directed to the provision of a caging device which may be added readily to a specific type of gyro of which many thousands are now in use.

The invention, however, is by no means limited to this particular type of gyro, but for convenience will be described as being used in connection therewith.

Gyros of the type referred to have flat portions formed in their casings opposite the ends of the spin axis, and in these flat portions, indicated in the drawings by reference characters 20—21, 22—23, openings are formed in alignment with the ends of the spin axis to give access to the rotor bearings.

In connection with the present invention, bearing retaining members 24, FIGS. 1 and 4, are attached by screws 25 to the gimbal frame overlying the bearings for the rotor, the members being substituted for former covers for these bearings.

Each retaining member 24 has a pair of caging slots 27 and 28 formed therein disposed respectively above and below the spin axis in line with the path thereof. The slots are approximately oblong in shape, being somewhat curved at the outer edges, conforming to the circular shape of the retaining members. The straight inner portion of the slots is disposed parallel to the precession axis 15. The relatively narrow end portion of an individual caging lever, to be described, is disposed in each caging slot, which lever is mounted in cagers attached to the gyro casing at opposite ends of the spin axis in the present embodiment of the invention.

It will be understood that the cager about to be described may be modified in various ways according to requirements. The cager shown consists of a base 29, of a size suitable for attaching to the outside of a gyroscope casing overlying the rotor bearing access openings between the parts 20 and 21, or 22 and 23 of the gyro casing, a central opening 30 in base 29 being in alignment with an end of the spin axis. The respective cagers are attached to the gyroscope casing by screws 18 which extend through openings 19 in the base 29. The openings 19 are elongated in the direction of rotation of the gimbal frame to permit adjustment of the caging position.

A ring 31 is formed on base 29 coaxially with respect to opening 30. A diaphragm 32 is secured between the ring and a dish-shaped cap 34, the cap, diaphragm and ring being fastened together by screws 35.

A disc of hard metal 36 is provided with a centrally located stem 37 which extends through a hole in the center of diaphragm 32 and is secured to the diaphragm adjacent to the stem by a collar 38 having an inner bevelled surface over which the end of the stem is peaned securing the inner edge of the diaphragm between disc 36 and collar 38. The outer end of the collar normally rests against cap 34 spacing the diaphragm therefrom and also providing a back stop for a pair of spring urged caging levers. The levers are operated by the metal disc when it is displaced by the diaphragm.

Caging levers 40 and 41 are L-shaped and are mounted in recesses formed in the base, the levers being pivoted respectively on small rods 42 and 43 disposed in deep parallel grooves 44 or 45 formed in the flat inner surface of base 29 on opposite sides of opening 30. The rods are retained in the grooves by peaning or pressing down a portion of the base near the ends of the rods where indicated by circles 46.

Spring 47 attached to both levers tends to move the levers to the position shown by the solid lines of FIG. 2, the inner and longer ends of the levers pressing against disc 36 and holding collar 38 against cap 34.

Arm 50 of lever 40 is bifurcated, FIG. 3, and the respective ends are formed with small rounded projections 51, FIG. 2, which ride on the polished surface of disc 36 attached to the diaphragm 32 practically without friction. Arm 52 of lever 41 is reduced in size near its end, and the narrower part 53 thereof is freely movable between the forked parts of lever 40. The part 53 of lever 41 is provided with a rounded projection 54 which engages the surface of disc 36. Projection 54 has a contact area equivalent to both of the projections 51 of lever 40 and therefore disc 36, when actuated by the diaphragm as will be described, exerts equal forces on the lever.

The shorter arms 55 of levers 40 and 41 are alike. Both arms are formed with relatively thin end portions 56 which project respectively into either one of the slots 27 or 28. When the levers are not actuated by the diaphragm both are clear of the slots for the maximum angle of precession. The outer faces of the portions 56 of the lever are curved slightly to conform to the curved surfaces of the slots 27 or 28. The arrangement for actuating the levers to cage the gyro will now be described.

The cap 34 of each cager is provided with a nipple 60 communicating with the space between the surface of the diaphragm and the under-surface of the cap which forms an air chamber 61 for actuating the diaphragm. In accordance with one embodiment of the invention, flexible air hoses 62 attached between the nipples and a manifold 63 supply air to the air chambers of the respective cagers. In FIG. 1 a second pair of air hoses 64 also attached to manifold 63 are used to supply air to control similar cagers of a vertical gyro, not shown.

Air is supplied to the manifold by a hose 65 connected between the source 16 of compressed air and an input 66 of a valve 67 having one output connected to manifold 63 and a second 68 for releasing air pressure from the cagers.

The valve 67 includes a ball movable to either of two positions under control of a solenoid and a pair of springs. The solenoid 70 is energized by a circuit from a battery 71 which includes a normally open switch 72. Preferably switch 72 is a push button switch mounted on one of the hand grips 73 used for tracking.

The drawing shows switch 72 in closed position which causes the solenoid plunger 74 to be displaced toward the right compressing spring 75. When the plunger is thus actuated, valve spring 76 displaces the ball 69 toward the right uncovering the input 66 to the valve and closing the outlet 68 therefrom. Air from the source 16 then can flow through the valve into the manifold 63, and thence into air chambers 61 of the respective cagers. When the push button switch 72 is released, spring 75 moves the plunger toward the left. Spring 75 is strong enough to move ball 69 toward the left against the pressure of spring 76 and to seat the ball over the inlet port 66 of the valve, thus shutting off air from the source 16. The entrance of the manifold which communicates with the interior of the valve is blocked at no time by ball 69, and therefore, immediately on the unseating of the ball from outlet 68, pressure is released from the manifold and all cagers. This arrangement insures practically no loss of air or pressure in the overall system during caging. The only air lost is that which goes past the valve into the cager and then exhausts when the gyro is uncaged.

When switch 72 is operated, the air chamber 61 of the cagers in inflated turning each pair of levers 40—41 equally on their pivots. If the gyro is displaced in either direction about its precession axis, a lever 40 on one end and a lever 41 at the opposite end of the spin axis, depending on the direction of tilt, will engage the outer edge of their slots and move the gimbal frame in the direction of its neutral position where the opposite levers of each pair will be engaged by the outer edges of the associated slots preventing further rotation of the gimbal frame. The gimbal frame is then held against rotation in either direction thus caging the gyroscope. The torque of the caging levers is effective about the pivots of the respective levers and therefore no lateral thrust is imparted to the gimbal support. More accurate caging is possible by the use of two caging devices acting on opposite sides of the spin axis and the arrangement eliminates transitory lateral and rotary vibrations.

The force excited by the cager is limited only to the available air pressure, the size of the diaphragm and the mechanical advantage of the levers. The force can be increased or decreased by slight changes in either or all of these parts.

An important feature of the caging apparatus described herein is that it is very easy to install in existing gyroscope structures. The cagers are readily adjusted to cage the gyroscope in the desired caging position. Assuming that some suitable reference such as a hairline is available to indicate the neutral position of the gyro, the cagers may be positioned as follows. The screws 18 by which the cagers are attached to the casing are loosened slightly. Air is cut-off from one of the caging units and supplied to the other which cages one side of the gyro. By tapping up or down the base 29 of the latter unit and observing the position of the hairline or other reference, the gyroscope can be made to cage at any point. The screws holding the cager are then tightened, and the same procedure followed for adjusting the remaining cagers. When both sides are adjusted to the desired position, air is allowed to flow into the cagers of both sides and the position of caging checked. All of these adjustments are easy to make because the levers always align themselves in a "singular" mechanical position. This condition maintains because, when the levers are in the dotted position of FIG. 2, the lines of contact of surface 54 with disc 36 and of surface 51 with disc 36 are coincident; therefore, any torques exerted by the gimbal 14 tending to move either cager lever is immediately counteracted by the full air pressure acting on diaphragm 32 and disc 36. Since this is the only completely stable position of the lever system, the cager will always return to this "singular" mechanical position when air pressure is applied.

The caging apparatus described herein may be used with gyros having limited angular displacement other than the spring suspended gyros referred to above. It has been found that a single cager may be used effectively in connection with a gyro having a gimbal frame supported by ball-bearing shafts.

It will be understood from the foregoing that the invention is suitable for caging gyros by remote control.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a gyroscope wherein the rotor bearing frame normally precesses for small angular distances on either side of a neutral position, a caging mechanism comprising a pair of caging devices, for each side of said frame disposed respectively adjacent the rotor shaft ends, separate stop means fixed to the rotor frame overlying the respective ends of the rotor shaft adapted to be engaged by the respective caging devices on the operation thereof and means for operating the caging devices simultaneously whereby uniform caging forces are applied to the stop means to move the rotor shaft accurately to caged position.

2. In a gyroscope wherein the gyro rotor shaft and its frame normally precess in a predetermined plane for small angular distances on either side of a neutral position, a caging mechanism comprising a pair of caging devices, one disposed near each end of the rotor shaft, separate stop means fixed to the rotor frame overlying the respective ends of the rotor shaft adapted to be engaged by the respective caging devices on the operation thereof and pneumatic means operable at will for actuating the caging devices to apply caging forces to the stop means to maintain the rotor shaft accurately in caged position.

3. A caging unit for a gyroscope comprising a support, a pair of pivots attached thereto in spaced parallel relation, a pair of caging levers supported respectively by the pivots, means comprising a common pneumatically actuated diaphragm for moving corresponding arms of the levers simultaneously in opposite directions away from each other from a normal position of rest, and means fixed with respect to the spin axis of the gyro adapted to be engaged and secured by said arms when thus moved by said means, for the purpose of caging the gyro.

4. A caging unit adapted to be attached to the casing of a rate gyro having a rotor bearing frame, which comprises a base formed with a central opening, a pair of pivots attached thereto on opposite sides of the opening, a pair of L-shaped levers supported respectively on the pivots disposed with corresponding arms extending toward each other across the center of the opening, the other arms of the levers projecting outward from the base, a flexible diaphragm disposed over the opening, a lever operating member disposed on one side of the diaphragm engaging the first mentioned arms of the levers, a dish-shaped member overlying the opposite side of the diaphragm forming an air chamber therewith, and a source of compressed air for inflating the air chamber for turning the levers on their pivots.

5. A caging unit adapted to be attached to the casing of a rate gyro having a rotor bearing frame, which comprises a base formed with a central opening, a pair of pivots attached thereto on opposite sides of the opening, a pair of L-shaped levers supported respectively on the pivots, the pivots being so disposed that corresponding arms of the levers extend toward each other across the center of the opening, while the other arms of the levers project outwardly form the base, a flexible diaphragm disposed over the opening, a lever operating member disposed on one side of the diaphragm engaging the first mentioned arms of the levers, a dish-shaped member overlying the opposite side of the diaphragm forming an air chamber therewith, spring means attached to the levers tending to maintain the levers pressed against the lever operating member, and a source of compressed air for inflating the air chamber at will whereby the levers are turned on their pivots by the lever operating member.

6. A caging unit for a gyroscope comprising a support, a pair of members pivoted thereon for co-planar movement, means comprising a common pneumatically actuated diaphragm for moving the members on their pivots simultaneously in opposite directions away from each other from a normal position of rest, and a device fixed with respect to the gyro rotor axis adapted to be engaged initially by one of the other of the members when thus moved, the engaging member being effective to turn the rotor axis toward a neutral position beyond which further movement is prevented by engagement of the device with the other member.

7. In a gyroscope having a rotor frame displaceable about a precession axis from a neutral position in either direction, a caging unit comprising a support fixed with respect to the rotor frame, a pair of members pivoted on the support for movement in a plane at right angles to the precession axis, means for moving the members in opposite directions away from each other, and a device fixed to the rotor frame opposite the members adapted to be engaged initially by one or the other of the members when thus moved, depending on the direction of any displacement of the rotor frame; the rotor axis being turned by the engaging member toward neutral position, beyond which further movement is prevented by the engagement of the device with the other of the members.

8. In a rate gyro having a casing wherein a rotor frame provided with rotor bearings is supported for limited displacement in either direction from a neutral position about a precession axis, a caging mechanism comprising a pair of pivots attached to the casing parallel to the precession axis and in spaced relation offset from opposite sides of a rotor bearing, a lever on each pivot, each having an arm directed toward said rotor bearing, means for receiving the arms but normally out of contact therewith attached to the rotor frame overlying said bearing, and means for displacing said levers in opposite directions effective to cause the arms to engage the receiving means and thereby cage the gyro.

9. In a rate gyro having a casing wherein a rotor frame provided with rotor bearings is supported for limited displacement in either direction from a neutral position about a precession axis, a caging mechanism comprising a pair of pivots supported by the casing offset from opposite sides of a rotor bearing and parallel to the precession axis, a lever on each pivot, each having an arm directed generally toward said rotor bearing, spring means attached to the levers tending to maintain them in a normal position of rest, means attached to the rotor frame aligned with said bearing for receiving an end portion of each arm, the arms being disengaged from the means when in their position of rest, and means for displacing the levers in opposite directions effective to cause the arms to engage the receiving means and thereby cage the gyro.

10. In a rate gyro having a casing wherein a rotor frame provided with rotor bearings is supported for limited displacement in either direction from a neutral position about a precession axis, a caging mechanism comprising a pair of pivots supported by the casing equally spaced from opposite sides of the spin axis and parallel to the precession axis, a lever disposed on each pivot, each lever having an arm directed toward a rotor bearing, a device fixed to the rotor frame for receiving an end portion of each lever arm, a spring attached to the levers tending to maintain the levers in a normal position of rest with the arms thereof disengaged from the device, and pneumatic means common ot the levers effective at will to turn the same in opposite directions to cause the arms thereof to engage the device for the purpose of caging the gyro.

11. In a rate gyro having a casing wherein a rotor frame provided with rotor bearings is supported for limited displacement in either direction from a neutral position about a precession axis, a pair of caging mechanisms, one for each side of the rotor frame, the caging mechanisms comprising respectively a pair of pivots supported by the casing equally spaced from opposite sides of the spin axis and parallel to the precession axis, a lever disposed on each pivot, each lever having an arm directed generally toward the adjacent rotor bearing, a device for each caging mechanism fixed to the rotor frame for receiving an end portion of each lever arm, spring means attached to the levers tending to maintain them in a normal positon of rest with the arms thereof disengaged from the associated device, and pneumatic means common to both caging mechanisms effective at will to turn the levers of the respective caging mechanisms in opposite directions whereby the arms engage the associated devices, thereby caging the gyro.

12. In a rate gyro having a casing wherein a rotor frame provided with rotor bearings is supported for limited displacement in either direction from a neutral position about a precession axis, a caging mechanism comprising a pair of pivots attached to the casing in spaced relation parallel to the precession axis and offset from opposite sides of a rotor bearing, an L-shaped lever so disposed on each pivot as to have corresponding arms directed toward opposite sides of said rotor bearing, means for receiving the arms but normally out of contact therewith attached to the rotor frame overlying said bearing, and means for displacing the arms in opposite directions to engage the receiving means for the purpose of caging the gyro.

13. In a rate gyro having a casing wherein a rotor frame provided with rotor bearings is supported for limited displacement in either direction from a neutral position about a precession axis, a caging mechanism comprising a pair of pivots attached to the casing in spaced relation parallel to the precession axis and offset from opposite sides of a rotor bearing, an L-shaped lever so disposed on each pivot as to have corresponding arms directed toward opposite sides of said rotor bearing, means for receiving an end portion of said arms but normally out of engagement therewith attached to the rotor frame overlying said bearing, and means common to the opposite arms of the levers for displacing the same to cause the receiving means to be engaged by the first mentioned arms for the purpose of caging the gyro.

14. In a rate gyro having a casing wherein a rotor frame provided with rotor bearings is supported for limited displacement from a neutral position in either direction about a precession axis, a caging mechanism comprising a pair of L-shaped levers pivoted symmetrically to the casing adjacent a rotor bearing with corresponding arms of the respective levers projecting toward said bearing on opposite sides and in substantially parallel alignment with the axis of said rotor bearing, a member attached to the rotor frame overlying said bearing and enclosing an end portion of each arm but normally disengaged therefrom, and common means operable at will for engaging and rotating the opposite arms of the levers effective to bring the first mentioned arms thereof into engagement with said member for the purpose of caging the gyro.

15. In a rate gyro having a casing wherein a rotor frame provided with rotor bearings is supported for limited displacement from a neutral position in either direction about a precession axis, a caging mechanism comprising a pair of L-shaped levers pivoted to the casing adjacent a rotor bearing with corresponding arms of the levers projecting generally toward each other, and the opposite arms of the levers extending toward said bearing on opposite sides and in substantially parallel alignment with the axis of said rotor bearing, a member attached to the rotor frame overlying said bearing and enclosing an end portion of each of said opposite arms but normally disengaged therefrom, and common means engaging the first mentioned arms of the levers effective at will for simultaneously rotating both levers in opposite directions whereby said opposite arms engage the member and thereby cage the gyro.

16. In a rate gyro, a casing, a rotor bearing frame pivotally supported for limited displacement in either direction from a neutral position about a precession axis, a rotor supported in bearings in said frame to spin about an axis at right angles to said precession axis, a caging mechanism for said frame comprising a plurality of levers pivoted on said casing for rotation about spaced axes substantially parallel to said precession axis, said levers each comprising an arm portion adapted to project toward said frame in a direction normally parallel to said spin axis, stop means on said frame disposed in the path of pivotal movement of said levers but normally out of contact therewith, and an actuating member arranged directly to engage said levers to cause said arms to engage said stop means and thereby cage the gyro.

References Cited in the file of this patent

UNITED STATES PATENTS

| | | |
|---|---|---|
| 2,162,698 | Chafee et al. | June 20, 1939 |
| 2,273,309 | Zand | Feb. 17, 1942 |
| 2,348,731 | Esval et al. | May 16, 1944 |
| 2,393,124 | Smith | Jan. 15, 1946 |

FOREIGN PATENTS

| | | |
|---|---|---|
| 562,688 | Great Britain | July 12, 1944 |